G. L. LECLANCHE.
Galvanic-Batteries.
No. 5,769. Reissued Feb. 17, 1874.
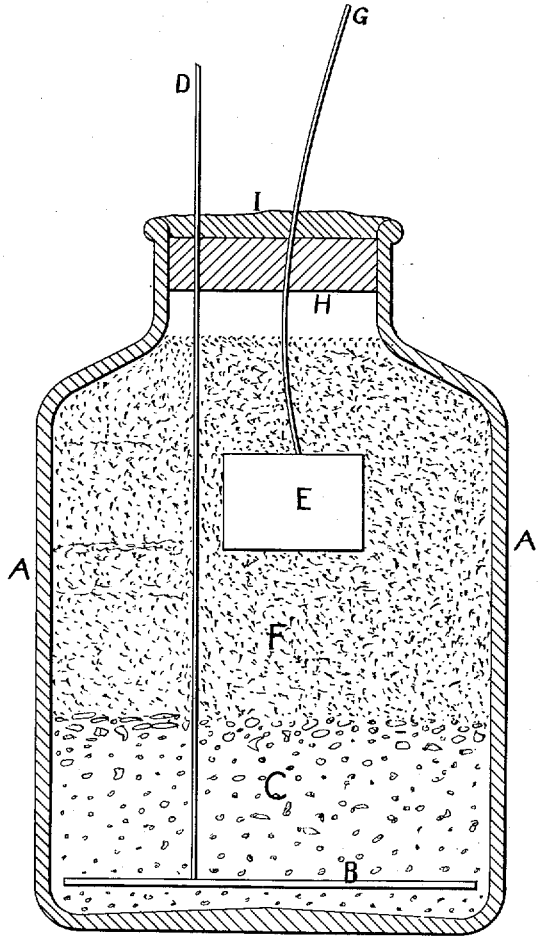
WITNESSES.
Henry Coleman
Wm. C. Chaffee
Georges L. Leclanche
By Boyd Elliot
Atty for the
INVENTOR.

UNITED STATES PATENT OFFICE.

GEORGES L. LECLANCHÉ, OF PARIS, FRANCE, ASSIGNOR TO HILBORNE L. ROOSEVELT, OF NEW YORK CITY.

IMPROVEMENT IN GALVANIC BATTERIES.

Specification forming part of Letters Patent No. 55,441, dated June 5, 1866; Reissue No. 5,769, dated February 17, 1874; application filed January 27, 1874.

DIVISION B.

*To all whom it may concern:*

Be it known that I, GEORGES LIONEL LECLANCHÉ, of Paris, in the Republic of France, have invented certain Improvements in Galvanic Batteries, of which the following is a specification:

Piles or batteries composed of two liquids in which the constancy of the current is obtained by means of the decomposition of a soluble salt of copper, have two or more serious disadvantages: First, the evaporation of the liquids; and, secondly, the permanent mixture of the two liquids, of whatever nature the porous diaphragm may be. The principal results of these two facts are, first, the necessity of renewing the evaporated liquid; secondly, a considerable waste of salt of copper; thirdly, a short duration of the pile or battery; and, fourthly, a sensible weakening of the current.

By substituting for the soluble salts of copper insoluble or slightly soluble salts of copper, I obtain the following advantages: First, facility in closing and sealing hermetically the piles or batteries; second, a duration at least double that of the piles or batteries hitherto used; third, avoidance of the necessity of superintendence; fourth, total abstinence of all internal chemical action when the pile or battery is not at work; and I have found that the salt of copper, insoluble or slightly soluble, which has given me the best results, is carbonate of copper.

I have also found in practice the following arrangement of parts to be the most preferable: I place in the bottom of a bottle or jar, having a large mouth, a plate of copper or any other metal, or even any other suitable substance, such as, for instance, graphite, or any other carbon good conductor of electricity, to which I attach a wire, to be used as one of the poles. I cover this plate with carbonate of copper reduced into a powder, and I then fill the bottle or jar nearly up to its mouth with sand or pulverized sand-stone, in the middle of which I place the zinc, bearing a copper wire, to be used as a negative pole. I then moisten the whole with a liquid containing a salt in solution capable, by its decomposition, of rendering soluble the salt employed.

In the case above mentioned, (carbonate of copper,) I moisten the whole with water containing about twenty per cent. of chlorhydrate of ammonia. The apparatus may then be hermetically closed. It is well understood that the two wires must be allowed to pass through the mouth of the bottle.

In order that my improvements be better understood, I have represented in the accompanying drawing a pile or battery constructed on my new system, in which A is the bottle or jar; B, the plate, of copper or other suitable electro-conductor; C, the carbonate of copper reduced into a powder; D, the wire attached to the plate, and to be used as one of the poles. E is the zinc; F, the sand or pulverized sandstone; G, the copper wire attached to the zinc, and used as the negative pole; H, the cork or bung, and I sealing-wax.

N. B. The whole (sand and carbonate of copper) is moistened with water containing chlorhydrate of ammonia.

Having thus explained the nature of my invention, and the best means that I am acquainted with for carrying the same into practice, I claim—

1. The combination, in electrical piles or batteries, of insoluble or slightly soluble salts of copper or other equivalent material, and a liquid containing a salt in solution capable, by its decomposition, of rendering the said salts of copper or other equivalent material soluble, substantially as described.

2. In a galvanic battery, the materials packed and sealed, substantially as described, and for the purposes set forth.

GEORGES L. LECLANCHÉ.

Witnesses:

GEORGE MERRILL,

JOHN MEREDITH READ, Jr.